United States Patent [19]

Boone

[11] 4,208,808
[45] Jun. 24, 1980

[54] BLOOD DRYING METHOD AND APPARATUS

[76] Inventor: L. A. Boone, 418 Bloomfield Rd., Bardstown, Ky. 40004

[21] Appl. No.: 885,657

[22] Filed: Mar. 13, 1978

[51] Int. Cl.² .................................................. F26B 17/12
[52] U.S. Cl. .................................... 34/166; 34/235; 34/234; 34/181; 426/32; 426/473
[58] Field of Search ................ 34/201, 235, 236, 166, 34/181; 426/32, 165, 473

[56] References Cited

U.S. PATENT DOCUMENTS

| | | | |
|---|---|---|---|
| 1,276,957 | 8/1918 | Reed | 34/166 |
| 1,489,702 | 4/1924 | Hare | 34/166 X |
| 1,632,321 | 6/1927 | Sternberg | 426/473 |
| 3,431,118 | 3/1969 | Macy et al. | 34/166 |
| 3,744,145 | 7/1973 | Maxwell et al. | 34/180 X |
| 3,909,958 | 10/1975 | Castanoli | 34/166 |

Primary Examiner—Edward G. Favors
Attorney, Agent, or Firm—Edward M. Steutermann

[57] ABSTRACT

The present invention provides a drying device for coagulating and/or drying a fluid material having significant solids content, such as animal blood, to produce a dried solid product where the device includes generally an upwardly sloped elongate housing of generally semicircular cross section of selected diameter to define a coagulation chamber where the top of a portion of the chamber can be open, heat source means to selectively heat the housing, elongate screw conveyor means disposed within the housing with its longitudinal axis parallel to the longitudinal axis of the housing where the screw conveyor has a shaft with generally continuous helical blade means extending radially therefrom and having an outer diameter approximately equal to the interior diameter of the chamber and where the screw conveyor is adapted for rotation in the chamber to agitate the fluid in a portion of the housing and to convey solid material from a first lower end of the housing, toward a second, higher, end of the housing for emission, vapor emission means located at a selected position between the first and second end of the housing for emission of vapor from the housing, cover means to cover the portion of the housing, and the screw conveyor, between the first end of the housing and the vapor emission means, and where the screw conveyor means includes spaced finger means extending radially from the shaft of the screw conveyor means toward the sidewall of the housing between the blades of the screw conveyor means in the area of the housing between the vapor emission means and the second end of the housing.

7 Claims, 3 Drawing Figures

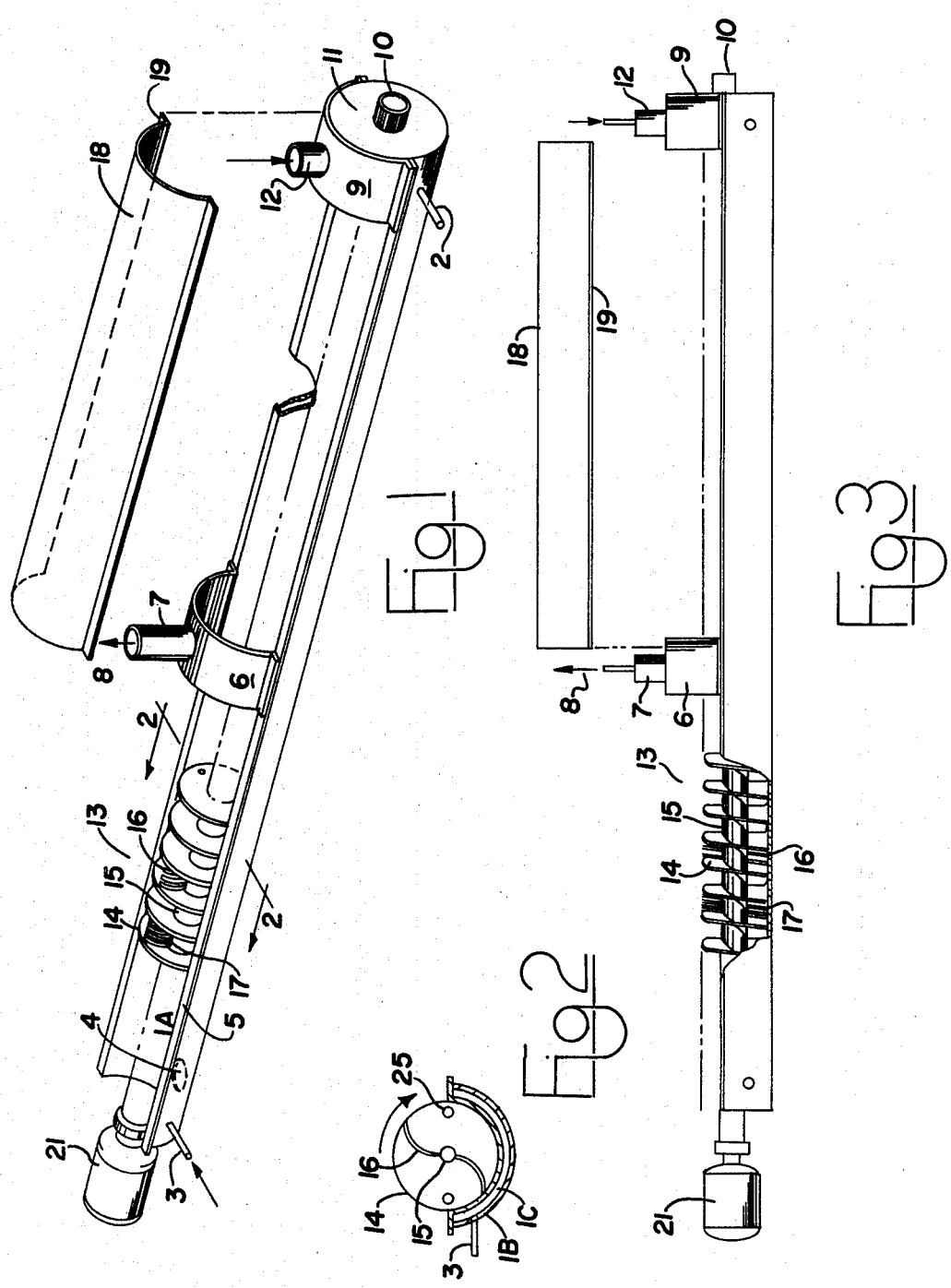

BLOOD DRYING METHOD AND APPARATUS

BACKGROUND OF THE INVENTION

During slaughtering operations in meat packing plants and slaughtering houses, the slaughtered animals are bled and the blood accumulated. Previously, the blood could be disposed of in sewers or other disposal means used. Current emphasis on environmental quality and particularly controls on industrial waste emissions have foreclosed many prior means utilized for blood disposal.

It is known that the blood resulting from the slaughter of animals, when coagulated and dried, provides a product with protein in high concentration so, with the advent of controls on the disposal of blood, drying animal blood for recovery of protein becomes economically feasible. The protein is relatively stable so the blood can be coagulated and dried at any temperatures below the decomposition temperature of the blood and, specifically, the blood can safely be exposed to the range of temperatures provided by low pressure steam.

Various devices have previously been provided expressly for drying blood. One such device as shown in U.S. Pat. No. 3,431,118 Macy et al, has included a screw conveyor mechanism in an inclined housing. However, the Macy reference relies on the use of live steam injected into the chamber where the blood is coagulated, but not dried and greatly increases the off-gas from the process. Since environmental regulations apply to vapor emissions as well as liquid emissions, the use of devices in accordance with Macy where live steam is injected would further complicate the circumstances surrounding disposal of the blood. The Macy process further requires drying and separation to provide a solid high protein product.

Another method for recovery of albumin or protein from animal blood is shown in U.S. Pat. No. 1,632,321 Sternberg, where a process including mechanical separation of the blood solids, for example by filtration, followed by drying and attrition of the products is disclosed.

None of the known processes for converting animal blood to a solid high protein product permits continuous conversion in a one-step process.

SUMMARY OF THE INVENTION

The present invention provides an economical straightforward method and apparatus for the conversion of animal blood to a solid high protein product. The method and apparatus in accordance with the present invention further provides a continuous, one-step process for conversion of animal blood to a high protein solid where secondary emissions, i.e. off gas from the process, are minimized as is energy consumption since second stage drying is eliminated.

The method and apparatus of the present invention further provides a single step arrangement yielding a comminuted product of selected size range substantially free of oversize particles.

More particularly, the present invention provides an apparatus which can be used for conversion of animal blood to a solid high protein product and includes an upwardly sloped elongate housing of semicircular cross section of selected diameter to define a coagulation chamber, heat source means to selectively heat the housing, elongate screw conveyor means having a shaft with helical blade means extending radially therefrom with a maximum diameter approximately equal to the interior diameter of the housing chamber and disposed with its longitudinal axis generally parallel to the longitudinal axis of the housing and adapted for rotation in the chamber to convey solid material from a first, lower, end of the housing, where the fluid is introduced toward a second, higher, end of the housing for emission of solids, vapor emission means located at a selected position between the first and second ends of the housing for emission of vapor from the housing, cover means to cover the open top portion of the housing between the vapor emission means and the first end of the housing, finger means extending radially from the screw conveyor shaft between the blades thereof, at the portion of the shaft between the vapor emission means and the second end of the housing wherein a portion of the fingers extend from the screw conveyor shaft to engage the side of the housing.

It will be understood that the following is but one example of an apparatus and method within the scope of the present invention and that various other arrangements, within the scope of the present invention, will occur to those skilled in the art upon reading the disclosure set forth hereinafter.

BRIEF DESCRIPTION OF THE DRAWINGS

FIG. 1 is a perspective, partly exploded, view of one example of a dryer arrangement in accordance with the present invention; and, FIG. 2 is a sectional view taken on line 2—2 of FIG. 1.

FIG. 3 is an elevational view of an assembled dryer in accordance with the present invention.

Referring first to FIG. 1, a semicircular housing 1 of selected diameter is provided to define a chamber 1A where a cooperative outwardly extending lips 5 are provided at the termination of housing 1 to, inter alia, receive a cover 18 as hereinafter described.

A screw conveyor assembly 13 is provided in housing 1 and includes at least one helical blade 14 which can be substantially continuous along the length of housing 1 and can have an outer diameter generally equal to the inner diameter of housing 1. As shown, shaft 15 of screw conveyor 13 can be disposed for rotation in a journal assembly 10 carried by an endplate 11 of housing 1.

A cooperative drive assembly 21, for example including an electric motor can be provided to rotate shaft 15 in housing 1 at a selected rate of rotation where drive assembly 21 can also include speed reducer means (not shown) to selectively reduce the speed of rotation of screw conveyor 13 to less than 150 revolutions per minute.

In accordance with another feature of the present invention, heat is supplied to housing 1 to coagulate the blood in housing 1, drive off the moisture and dry the remaining solids. In the example shown, housing 1 can be jacketed, where a steam chamber 1C is defined between the inner wall of housing 1 which also defines the chamber 1A and an outer shell 1B which is provided to define steam chamber 1C. In the example shown, the heat for housing 1 can be provided by live steam which can be admitted through a steam inlet 3 to steam chamber 1C. A steam or condensate outlet 2 is provided for emission of steam from chamber 1C. As shown in the example, the steam can be introduced at the upper end of housing 1 so that the maximum temperature differential is available at the upper end of the housing. As is known in the art, a steam trap (not shown) can be provided at the outlet 2 from housing 1 to prevent escape of live steam from the unit.

In accordance with another feature of the present invention, a cover 18, having substantially the same diameter as housing 1 is provided to cover the portion of screw conveyor 13 located in the lower end of housing 1. Cover 18 can include outwardly extending lips 19 to engage lips 5 of housing 1. Fastening means, not shown, can be provided to secure cover 18 to housing 1.

A partial cover 9, likewise having a diameter substantially equal to the diameter of housing 1, is provided at the lower end or inlet end of housing 1, as shown, to support a fluid inlet 12 for introduction of the fluid material to be processed, for example, animal blood, to housing 1.

A second partial cover 6 is provided intermediate the ends of housing 1, as shown, and includes a conduit 7 for emission of a gas stream 8. Conduit 7 can be connected to an induced draft fan, for removal of vapors released from the material being processed. The emitted vapors can be supplied to a pollution control device, not shown, to eliminate emission of unwanted pollutants into the atmosphere.

In accordance with one feature of the present invention, in operation, housing 1 is inclined (not shown) so that inlet 12 is located near the lowest point of housing 1 so that the fluid material admitted to the housing forms a pool in the lower end. An outlet 4 is provided at the end of housing 1 opposite the lower end and can, advantageously, be located in the bottom of housing 1 for emission of dried solids from housing 1.

The portion of housing 1, between cover 6 and outlet 4 provided in housing 1, can remain uncovered during the processing because most of the vapor has been removed from the material being processed in the lower section of housing 1 between cover 6 and cover 9 and emitted through a conduit 7.

In accordance with one feature of the present invention, screw conveyor 13 can be provided with fingers 16 and 17 which extend radially outwardly between the turns of blade 14 in the portion of the screw conveyor between partial cover 6 and outlet 4. The spacing between fingers 16 which are located closer to cover 6 can, advantageously, be greater than the spacing between fingers 17, which are located further along conveyor 13. That is, the number of fingers located between the turns of blade 14 can be increased along the length of the screw conveyor 13 between cover 6 and outlet 4 so that the spacing between the fingers decreases to define passages of smaller and smaller diameter so that particles forced between the fingers are of smaller size. Advantageously, a portion of the fingers 16 and 17 can extend outwardly from shaft 15 and can be made of a sturdy material such as steel and can be adapted to contact the sides of housing 1 for removal of deposited particulate material adhering to the sides of housing 1 and to break up large agglomerates. Also, fingers 16 and 17 can be curved in the direction of rotation of screw conveyor shaft 15 so the fingers wipe the sides of housing 1 to clean the wall and force agglomerated solids between the fingers to break them into smaller particles. As shown in the Figures, and particularly FIG. 2, two sets of fingers 180° apart can be provided; additional sets of fingers can also be provided and the fingers can be arranged in a helical pattern around the shaft 15 or the fingers can be provided in intermittent spaces.

Screw conveyor 13 can, advantageously, be adapted so that at least the lower part of blade 14 engages the lower inner surface of housing 1 so that the blood in the pool in the lower end of housing 1 is impelled upwardly with respect to the housing and in contact with the heated inner surface of housing 1 to dry the blood only to run back to the post, leaving the solids formed during the process to be moved along screw conveyor 13 for drying and comminution as hereinbefore discussed.

In the lower of section of housing 1, that is, the section located between partial covers 6 and 9 where the blood is introduced, the blades 15 of screw conveyor 13 can be provided with spaced apertures 25 as shown in FIG. 2 so that in the lower section the blood is emitted through the apertures to run backward toward the pool formed in the lower end of housing 1.

The material emitted from the unit is a solid, and contact and attrition by fingers 16 and 17 breaks up the agglomerates and provides an essentially uniform product which is conveyed through housing 1 by means of screw conveyor 13 and emitted through outlet 4.

In operation, the animal blood is admitted through inlet 12 and in a substantially liquid state. The steam provided to chamber 1C of housing 1 provides the heat to begin coagulation of the blood and removal of excess liquid. The lower portion of screw conveyor 13 agitates the pool of blood in the lower end of housing 1 and moves the particulate matter formed through evaporation of liquid and the coagulation of the solids by means of the heat provided in steam chamber 1C upwardly through the housing and eventually out of the pool of blood where the further coagulation, agglomeration and comminution of the solids occurs. It will be recognized that the depth of the pool of blood in the lower end of housing 1 is determined by the angular disposition of housing 1.

As the solids pass the midpoint of the conveyor, they begin to contact fingers 16 and 17 extending outwardly from shaft 15, which in some instances are wiped against the sidewall of housing 1 to remove solids deposited on the walls and so that particles can be forced between the fingers to be broken up, all as previously discussed.

The foregoing is but one example of an apparatus in accordance with the present invention, and it is recognized other arrangements within the scope of the present invention will become obvious to those skilled in the art upon reading the disclosure set forth hereinbefore.

The invention claimed is:

1. A drying device for coagulating and drying blood including:
   (a) a generally upwardly sloped housing of generally semicircular cross-section of selected diameter having a first lower end and a second upper end and having an elongate opening along a portion of the top side thereof and defining a drying chamber;
   (b) heat source means to selectively heat a portion of the innermost wall of said housing;
   (c) elongate screw conveyor means disposed within said housing for rotation within said housing around an axis parallel to the longitudinal axis of said housing to convey blood and solid material toward said second end of said housing where the screw conveyor provides a shaft with helical blade means secured thereto and extending radially outwardly therefrom and where the diameter of the blade means is approximately equal to the diameter of the housing;

(d) vapor emission means communicating with said drying chamber and located intermediate said first and second ends of said housing;

(e) blood supply means to supply blood to be treated to the lower portion of said housing to provide a pool of blood to be agitated by said conveyor where rotation of said conveyor carries liquid blood and solids upwardly along the axis of said housing;

(f) dried solids emission means adjacent the second end of said housing for emission of dried solids conveyed upwardly in said housing by said conveyor means;

(g) finger means extending radially outwardly from said conveyor shaft, along a portion thereof, to contact a portion of the inner surface of said housing to remove solid material from the inner surface of said housing.

2. The invention of claim 1 wherein said cover means extends generally from the lower end of said housing to the vapor emission means.

3. The invention of claim 1 wherein said heat source means includes jacket means surrounding a portion of said housing and steam supply means to selectively supply steam to said jacket means.

4. The invention of claim 1 wherein said vapor emission means includes induced draft means for removal of vapor from said housing.

5. The invention of claim 1 wherein said finger means are located in the portion of said conveyor means located between said vapor emission means and said second end of said housing.

6. The invention of claim 1 wherein said fingers are curved in the direction of rotation of said conveyor.

7. The invention of claim 1 wherein said blade means in the portion of said conveyor between said first end of said housing and said vapor emission means are selectively provided with apertures to allow blood being treated to flow through said aperture toward said first end of said housing.

* * * * *